(12) United States Patent
Harris et al.

(10) Patent No.: US 12,141,209 B2
(45) Date of Patent: Nov. 12, 2024

(54) MACHINE LEARNING AND PREDICTION USING GRAPH COMMUNITIES

(71) Applicant: Visa International Service Association, San Francisco, CA (US)

(72) Inventors: Theodore D. Harris, San Francisco, CA (US); Craig O'Connell, San Mateo, CA (US); Terry Angelos, Mountain View, CA (US); Tatiana Korolevskaya, Mountain View, CA (US); Yue Li, San Mateo, CA (US); Todd Sawyer, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 513 days.

(21) Appl. No.: 16/953,235

(22) Filed: Nov. 19, 2020

(65) Prior Publication Data

US 2021/0073283 A1     Mar. 11, 2021

Related U.S. Application Data

(63) Continuation of application No. 16/311,024, filed as application No. PCT/US2017/041537 on Jul. 11, 2017, now Pat. No. 10,872,298.

(Continued)

(51) Int. Cl.
G06F 16/9038     (2019.01)
G06F 16/901      (2019.01)
(Continued)

(52) U.S. Cl.
CPC ...... *G06F 16/9038* (2019.01); *G06F 16/9024* (2019.01); *G06F 17/18* (2013.01);
(Continued)

(58) Field of Classification Search
CPC ............ G06F 16/9024; G06F 16/9038; G06F 16/9536; G06F 17/18; G06N 20/00;
(Continued)

(56) References Cited

U.S. PATENT DOCUMENTS 8,645,292 B2    2/2014  Flinn et al.
9,223,849 B1   12/2015  Bilinski et al.
(Continued)

FOREIGN PATENT DOCUMENTS

WO    2014159540    10/2014
WO    2018013566    1/2018

OTHER PUBLICATIONS

U.S. Appl. No. 16/311,024, Non-Final Office Action, Mailed on May 13, 2020, 24 pages.

(Continued)

*Primary Examiner* — Brent Johnston Hoover
(74) *Attorney, Agent, or Firm* — Kilpatrick Townsend & Stockton LLP (57) ABSTRACT

Embodiments of the invention are directed to methods and devices for predicting interactions. One embodiment is directed to a method comprising receiving, by one or more computers, interaction data for a plurality of known interactions between resource providers and users, and creating a topological graph based on the plurality of known interactions. The method may further comprise determining, by the one or more computers, a plurality of communities to form a predictive model, and receiving a request for a prediction. In addition, the method may comprise applying the request to the predictive model, by the one or more computers, by identifying a community in the plurality of communities corresponding to the request, determining a node within the identified community, and providing information regarding the node as the requested prediction.

20 Claims, 6 Drawing Sheets

Related U.S. Application Data (60) Provisional application No. 62/360,799, filed on Jul. 11, 2016.

(51) Int. Cl.
  *G06F 17/18* (2006.01)
  *G06N 5/022* (2023.01)
  *G06N 5/04* (2023.01)
  *G06N 20/00* (2019.01)

(52) U.S. Cl.
  CPC .............. *G06N 5/022* (2013.01); *G06N 5/04* (2013.01); *G06N 20/00* (2019.01)

(58) Field of Classification Search
  CPC ................................ G06N 5/022; G06N 7/01; G06N 5/04; G06Q 30/0202; G06Q 30/0204
  See application file for complete search history.

(56) References Cited

U.S. PATENT DOCUMENTS

| | | |
|---|---|---|
| 2013/0080364 A1 | 3/2013 | Wilson et al. |
| 2013/0138479 A1 | 5/2013 | Mohan et al. |
| 2014/0180976 A1 | 6/2014 | Shama et al. |
| 2014/0304198 A1 | 10/2014 | Oral et al. |
| 2016/0162913 A1* | 6/2016 | Linden ............... G06Q 30/0202 705/7.31 |
| 2016/0188713 A1* | 6/2016 | Green .................... H04L 51/52 707/738 |
| 2016/0360336 A1* | 12/2016 | Gross .................... H04W 4/025 |

OTHER PUBLICATIONS

U.S. Appl. No. 16/311,024, Notice of Allowance, Mailed on Aug. 25, 2020, 14 pages.

Application No EP17828305.7, Extended European Search Report, Mailed on Jun. 24, 2019, 11 pages.

Li et al., "Modifying the DPClus Algorithm for Identifying Protein Complexes Based on New Topological Structures", BioMed Central, BMC Bioinformatics, vol. 9, No. 398, Sep. 25, 2008, pp. 1-6.

Application No. PCT/US2017/041537, International Preliminary Report on Patentability, Mailed on Jan. 24, 2019, 8 pages.

Application No. PCT/US2017/041537, International Search Report and Written Opinion, Mailed on Oct. 17, 2017, 12 pages.

* cited by examiner

MACHINE LEARNING AND PREDICTION USING GRAPH COMMUNITIES

CROSS-REFERENCES TO RELATED APPLICATIONS

This application is a Continuation of U.S. patent application Ser. No. 16/311,024 filed Dec. 18, 2018, which is a National Stage of International Application No. PCT/US2017/041537 filed Jul. 11, 2017, which claims priority to U.S. provisional patent application No. 62/360,799 filed Jul. 11, 2016, which are herein incorporated by reference in their entirety for all purposes.

BACKGROUND

In today's technological environment, mobile devices can be used to locate nearby restaurants, bars, clothing stores, etc. that may appeal to users. The mobile device may use stored applications that allow for the search of restaurants through queries of databases for information that may be deemed relevant. For example, a user may open Google Maps™ on his or her mobile device phone and type in the words "Mexican food," and a map may be shown to the user displaying a nearby taco stand or any other nearby establishment tagged with the keyword "Mexican food" within a certain distance from the user. However, the results of such a query may not necessarily appeal to the user, as each and every user may have specific preferences that such an application may find difficult to anticipate. Some users, for example, may typically prefer fast food over more expensive sit-down restaurants or vice versa. Some users may typically prefer more trendy restaurants that appeal to other users within the same age group or demographic.

Embodiments of the invention address these and other problems, individually and collectively.

BRIEF SUMMARY

Embodiments of the invention are directed to methods and devices for predicting interactions. One embodiment is directed to a method comprising receiving, by one or more computers, interaction data for a plurality of known interactions between resource providers and users, and creating a topological graph based on the plurality of known interactions. The method may further comprise determining, by the one or more computers, a plurality of communities to form a predictive model, and receiving a request for a prediction. In addition, the method may comprise applying the request to the predictive model, by the one or more computers, by identifying a community in the plurality of communities corresponding to the request, determining a node within the identified community, and providing information regarding the node as the requested prediction.

In one embodiment, the plurality of communities are determined by computing a weight of each edge in the topological graph and computing a weight of each node in the topological graph based on the computed weights of each of the edges. The communities may further be determined by generating a queue comprising the nodes in decreasing order by weight, selecting a seed node from the queue, the seed node being a highest weighted node in the queue, and generating a community comprising the seed node. Then, the communities may be determined by calculating an interaction probability for each node not included in the community, determining a highest priority node based on the interaction probabilities, determining if the highest priority node meets predefined criteria, and adding the highest priority node to the community if it is determined that the highest priority meets the predefined criteria. The process of determining communities from the graph may continue by repeating the prior steps until it is determined that the highest priority candidate node does not meet the predefined criteria. Once a community has been built, the method may further comprise outputting the community, removing nodes included in the community from the queue, and repeating the prior steps until the queue is empty.

Other embodiments are directed towards computers and user devices for implementing the above method.

DETAILED DESCRIPTION

Prior to discussing specific embodiments of the invention, some terms may be described in detail.

A "user" may refer to an individual. In some embodiments, a user may be associated with data. The data may be associated with one or more personal accounts and/or user devices. A user can be identified by his or her data, personal accounts, and/or devices.

A "user device" may include any device that can be operated by a user. A user device can be referred to as a communication device, that can allow for communication to one or more computers. A communication device can be referred to as a mobile device if the mobile device has the ability to communicate data remotely.

A "mobile device" may comprise any suitable electronic device that may be transported and operated by a user, which may also provide remote communication capabilities over a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile devices include mobile phones (e.g. cellular phones), PDAs, tablet computers, net books, laptop computers, personal music players, hand-held specialized readers, etc. Further examples of mobile devices include wearable devices, such as smart watches, fitness bands, ankle bracelets, rings, earrings, etc., as well as automobiles with remote communication capabilities. A mobile device may comprise any suitable hardware and software for performing such functions, and may also include multiple devices or components (e.g. when a device has remote access to a network by tethering to another device—i.e. using the other device as a modem—both devices taken together may be considered a single mobile device). A mobile device may further comprise means for determining/generating location data. For example, a mobile device may comprise means for communicating with a global positioning system (e.g. GPS).

An "application" may be computer code or other data stored on a computer readable medium (e.g. memory element or secure element) that may be executable by a processor to complete a task.

A "resource provider" may be an entity that can provide a resource such as goods, services, information, and/or access. Examples of resource providers include merchants, access devices, secure data access points, etc. A "merchant" may typically be an entity that engages in transactions and can sell goods or services, or provide access to goods or services.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

A "transport computer" may refer to an intermediary computer that can transport data. A transport computer can be a computer of an acquirer. An "acquirer" may be an entity that can process interactions on behalf of a resource provider. For example, the acquirer can be a business entity (e.g., a commercial bank) that establishes relationships with resource providers, such that the resource providers can meet transaction processing requirements. Some entities can perform both issuer and acquirer functions. Some embodiments may encompass such single entity issuer-acquirers.

An "authorizing computer" may be a computer of an authorizing entity. An "authorizing entity" may be an entity that can authorize interactions. Examples of an authorizing entity may be an issuer, a governmental agency, a document repository, an access administrator, etc. An "issuer" may typically refer to a business entity (e.g., a bank) that maintains an account for a user. An issuer may also issue credentials to a user, such as a user account.

An "authorization request message" may be an electronic message that requests authorization for an interaction. An authorization request message according to some embodiments may comply with ISO 8583, which is a standard for systems that exchange electronic interaction information associated with a user using an issued user account. The authorization request message may include an issuer account identifier that may be associated with the user's account. An authorization request message can also comprise additional data elements corresponding to "identification information" including, by way of example only: a service code, a CVV (card verification value), a primary account number (PAN), a token, a user name, an expiration date, etc. An authorization request message may also comprise "interaction information," such as any information associated with a current interaction, such as an interaction location, transaction amount, resource provider identifier, resource provider location, bank identification number (BIN), merchant category code (MCC), information identifying resources being provided/exchanged, etc., as well as any other information that may be utilized in determining whether to identify and/or authorize an interaction.

An "authorization response message" may be a message that responds to an authorization request. The authorization response message may include, by way of example only, one or more of the following status indicators: Approval—transaction was approved; Decline—transaction was not approved; or Call Center—response pending more information, merchant calls the toll-free authorization phone number. The authorization response message may also include an authorization code. The code may serve as proof of authorization for an interaction.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "graphics processing unit" or "GPU" may refer to an electronic circuit designed for the creation of images intended for output to a display device. The display device may be a screen, and the GPU may accelerate the creation of images in a frame buffer by rapidly manipulating and altering memory. GPUs may be have a parallel structure that make them more efficient than general-purpose CPUs for algorithms where the processing of large blocks of data is done in parallel. Examples of GPUs may include Radeon™ HD 6000 Series, Polaris™ 11, NVIDIA GeForce™ 900 Series, NVIDIA Pascal™, etc.

A "topological graph" may refer to a representation of a graph in a plane of distinct vertices connected by edges. The distinct vertices in a topological graph may be referred to as "nodes." Each node may represent specific information for an event or may represent specific information for a profile of an entity or object. The nodes may be related to one another by a set of edges, E. An "edge" may be described as an unordered pair composed of two nodes as a subset of the graph G=(V, E), where is G is a graph comprising a set V of vertices (nodes) connected by a set of edges E. For example, a topological graph may represent a transaction network in which a node representing a transaction may be connected by edges to one or more nodes that are related to the transaction, such as nodes representing information of a device, a user, a transaction type, etc. An edge may be associated with a numerical value, referred to as a "weight", that may be assigned to the pairwise connection between the two nodes. The edge weight may be identified as a strength of connectivity between two nodes and/or may be related to a cost or distance, as it often represents a quantity that is required to move from one node to the next.

The term "artificial intelligence model" or "AI model" may refer to a model that may be used to predict outcomes in order achieve a pre-defined goal. The AI model may be developed using a learning algorithm, in which training data is classified based on known or inferred patterns. An AI model may also be referred to as a "machine learning model" or "predictive model."

A "subgraph" or "sub-graph" may refer to a graph formed from a subset of elements of a larger graph. The elements may include vertices and connecting edges, and the subset may be a set of nodes and edges selected amongst the entire set of nodes and edges for the larger graph. For example, a plurality of subgraph can be formed by randomly sampling graph data, wherein each of the random samples can be a subgraph. Each subgraph can overlap another subgraph formed from the same larger graph.

A "community" may refer to a group/collection of nodes in a graph that are densely connected within the group. A community may be a subgraph or a portion/derivative thereof and a subgraph may or may not be a community and/or comprise one or more communities. A community may be identified from a graph using a graph learning algorithm, such as a graph learning algorithm for mapping protein complexes. Communities identified using historical data can be used to classify new data for making predictions. For example, identifying communities can be used as part of a machine learning process, in which predictions about information elements can be made based on their relation to one another.

A "data set" may refer to a collection of related sets of information composed of separate elements that can be manipulated as a unit by a computer. A data set may comprise known data, which may be seen as past data or "historical data." Data that is yet to be collected, may be referred to as future data or "unknown data." When future data is received at a later point it time and recorded, it can be referred to as "new known data" or "recently known" data, and can be combined with initial known data to form a larger history.

"Unsupervised learning" may refer to a type of learning algorithm used to classify information in a dataset by labeling inputs and/or groups of inputs. One method of unsupervised learning can be cluster analysis, which can be used to find hidden patterns or grouping in data. The clusters may be modeled using a measure of similarity, which can defined using one or metrics, such as Euclidean distance.

Figure 6:
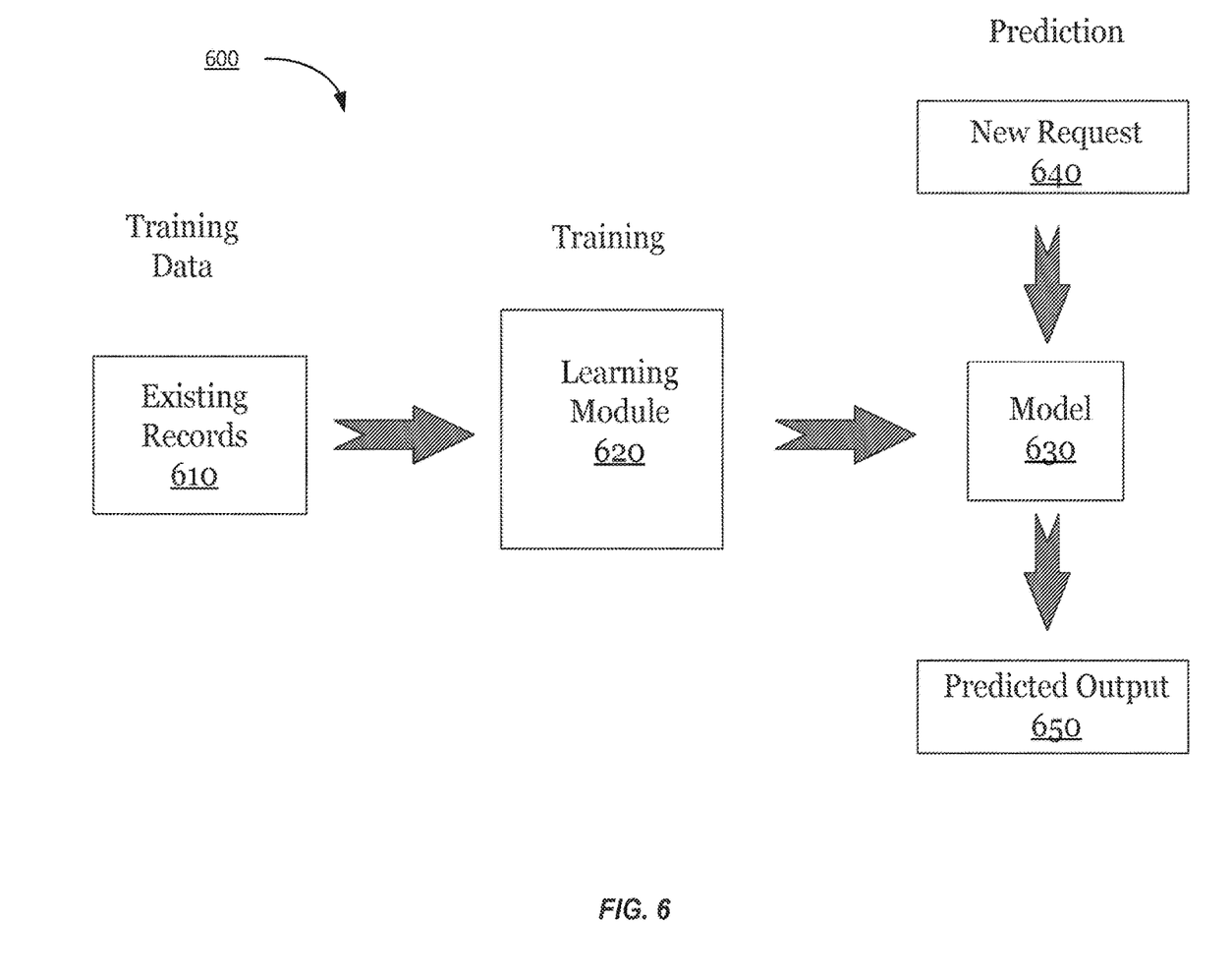
FIG. 6 shows a diagram of a machine learning process.

"Machine learning" may refer to an artificial intelligence process in which software applications may be trained to make accurate predictions through learning. The predictions can be generated by applying input data to a predictive model formed from performing statistical analysis on aggregated data. FIG. 6 shows a high-level diagram depicting a machine learning process. According to process 600, a model 630 can be trained using training data, such that the model may be used to make accurate predictions. The prediction can be, for example, a classification of an image (e.g. identifying images of cats on the Internet) or as another example, a recommendation (e.g. a movie that a user may like or a restaurant that a consumer might enjoy).

Training data may be collected as existing records 610. Existing records 610 can be any data from which patterns can be determined from. These patterns may then be applied to new data at a later point in time to make a prediction. Existing records 610 may be, for example, user data collected over a network, such as user browser history or user spending history. Using existing records 610 as training data, training may be performed through learning module 620. Learning module 620 may comprise a learning algorithm, which may be used to build model 630.

Model 630 may be a statistical model, which can be used to predict unknown information from known information. For example, learning module 620 may be a set of instructions for generating a regression line from training data (supervised learning) or a set of instructions for grouping data into clusters of different classifications of data based on similarity, connectivity, and/or distance between data points (unsupervised learning). The regression line or data clusters can then be used as a model for predicting unknown information from known information. Once model 630 has been built from learning module 620, model 630 may be used to generate a predicted output 650 from a new request 640. New request 640 may be a request for a prediction associated with presented data. For example, new request 640 may be a request for classifying an image or for a recommendation for a user.

New request 640 may comprise the data that a prediction is requested for. For example, new request 640 may comprise pixel data for an image that is to be classified or may comprise user information (e.g. name, location, user history, etc.) that can be used to determine an appropriate recommendation. In order to generate predicted output 650 from new request 640, the data included in new request 640 can be compared against model 630. For example, the position of data received in new request 640 on a graph can be compared against a regression line to predict its next state (i.e. according to a trend). In another example, the position of the data as plotted on a topological graph can be used to determine its classification (e.g. predicting tastes and preferences of a user based on his or her online interactions).

Figure 1:
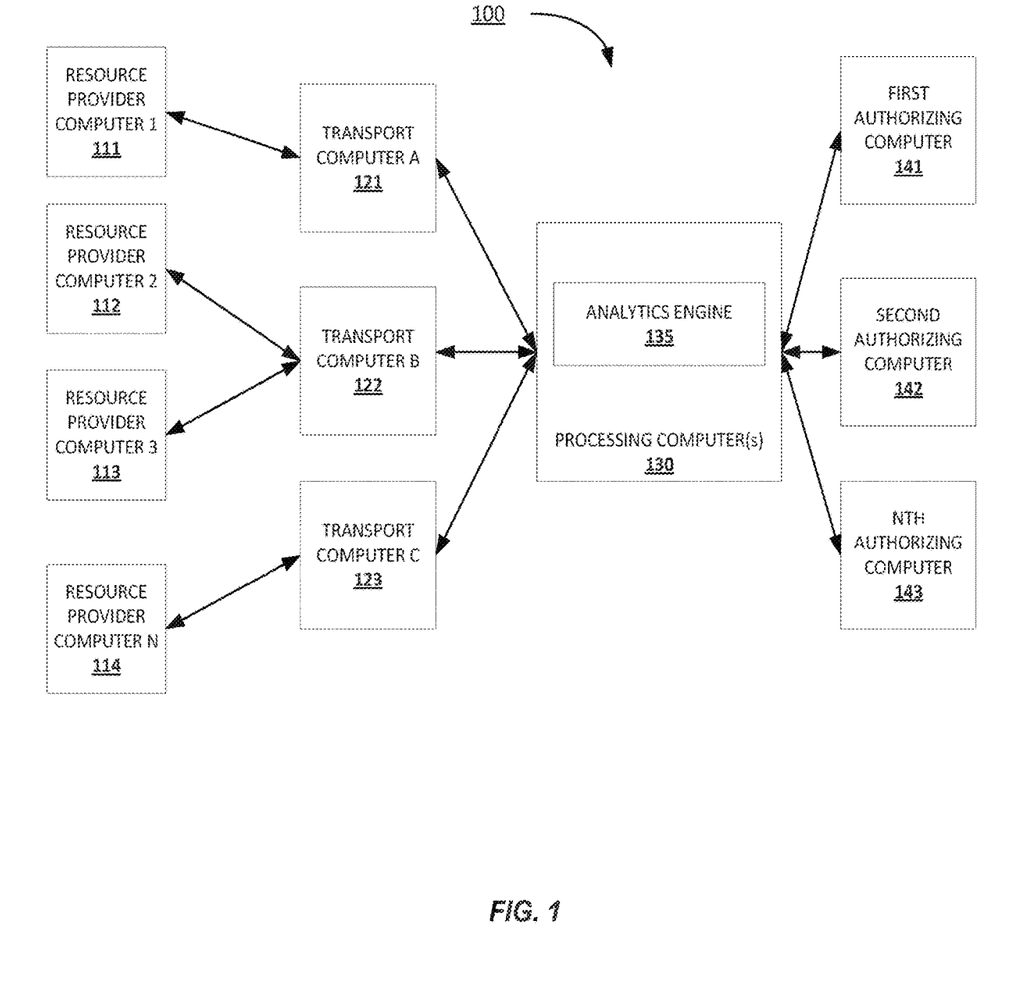
FIG. 1 shows a system diagram for obtaining interaction data in a network.

Embodiments of the invention are directed to methods and devices for predicting interactions that may not be intuitive or obvious to an ordinary observer. The predicted interactions may be derived from data associated with a number of different resource providers. FIG. 1 shows a system diagram for obtaining interaction data in a network. In embodiments, data for interactions conducted with resource providers may be processed by one or more processing computers. System 100 may comprise a plurality of resource provider computers, such as resource provider computer 1—111, resource provider computer 2—112, resource provider computer 3—113, and resource provider computer N—114. Each resource provider computer in the plurality of resource provider computers may be linked to a resource provider that interacts with users. For example, a resource provider computer may be a computer of a merchant that is used to conduct transactions with users who wish to exchange funds for resources, such as a good or service (i.e. payment transactions).

System 100 may further comprise a plurality of transport computers, such as transport computer A 121, transport computer B 122, and transport computer C 123. Each transport computer in the plurality of transport computers may be a computer for transporting data received from a resource provider computer during an interaction to a processing computer, such as processing computer(s) 130. Processing computer(s) 130 may be one or more computers (e.g. server computers) for processing interactions. Processing computer(s) 130 may further comprise analytics engine 135 for analyzing interaction data in system 100.

System 100 may additionally comprise a plurality of authorizing computers, such as first authorizing computer 141, second authorizing computer 142, and/or third authorizing computer 143. Each authorizing computer in the plurality of authorizing computer may authorize a plurality of interactions conducted according to system 100. For example, first authorizing computer 141 may be a computer of an entity that can issue user accounts and/or user credentials (e.g. a bank that issues payment accounts to users, or a security agency that issues access credentials). According to embodiments, interaction data may be sent from a resource provider computer to a transport computer, and may then be received by a processing computer. The processing computer may record and analyze the interaction data, and may then forward the interaction data to an authorizing computer so that the interaction may be authorized. In one embodiment, the interaction data (e.g., any of the data elements such as a PAN, token, transaction amount, CVV, etc. described above in an authorization request message) may be transmitted to each computer via an authorization request message. In another embodiment, an indication of the interaction's determined authorization may be included in an authorization response message (e.g. an indication that a user should be denied or approved access to a building or an indication that a user has sufficient funds to conduct a transaction).

In embodiments, interaction data accessible by processing computer(s) 130 may be analyzed via analytics engine 135 for generating predictions requested by users. In an embodiment, the interaction data may comprise data for user interactions with resource providers (e.g. content providers, merchants, etc.), and the requested predictions may include future interactions that users are predicted to conduct at a later point in time. The predicted future transactions may be delivered to the users in the form of recommendations. In embodiments, the predictions may be generated using a predictive model. In one embodiment, the predictive model may be a predictive model that comprises communities of dense (i.e. frequent) interaction. In an embodiment, the predictive model may comprise determined communities (i.e. clusters) of nodes for specific types of users and for the specific resource providers that the specific types of users frequently interact with/have a high probability of interacting with.

Figure 2:
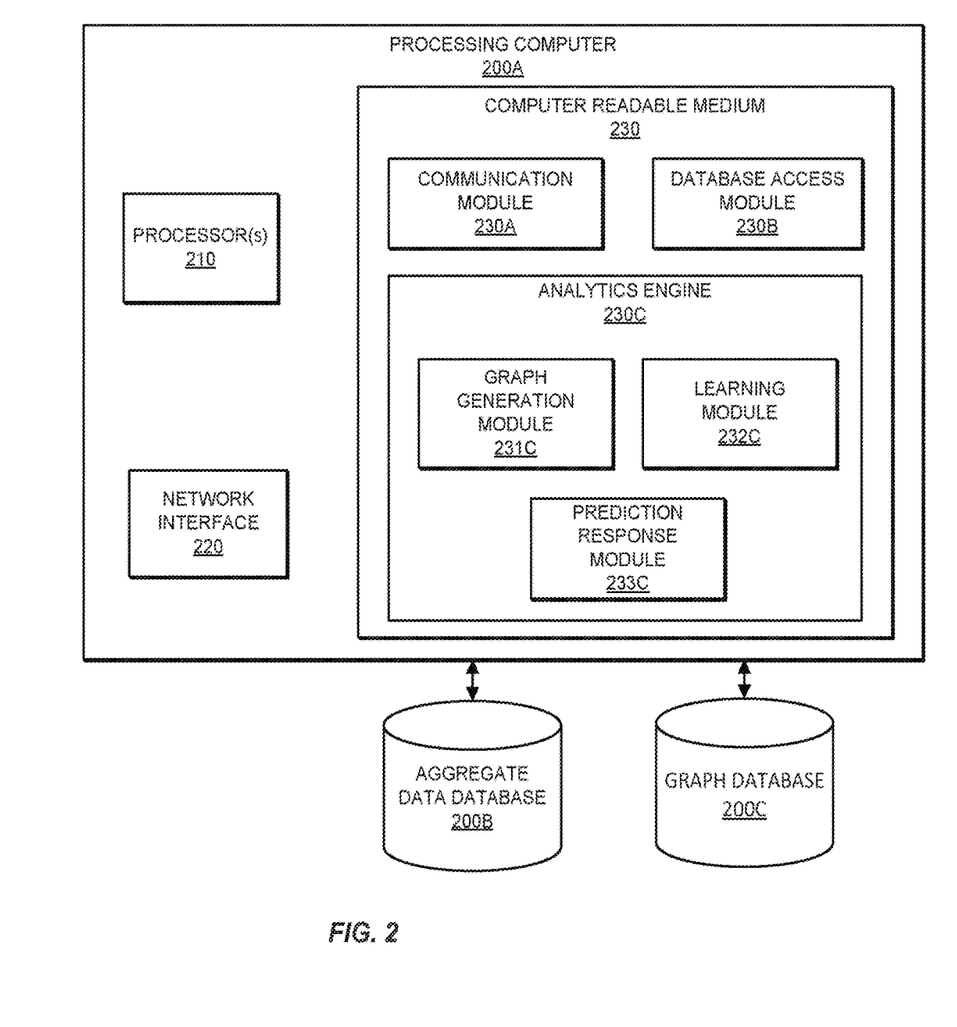
FIG. 2 shows a block diagram of a processing computer for generating predictions according to an embodiment.

FIG. 2 shows a block diagram of a processing computer for generating predictions according to an embodiment. In an embodiment, processing computer 200A may be processing computer(s) 130 of FIG. 1. Processing computer 200A may comprise one or more processors, such as processor(s) 210. Processor(s) 210 may include any number of processors for executing instructions (e.g. code). For example, processor(s) 210 may include a central processing unit (CPU) and a plurality of graphics processing units (GPUs). Processing computer 200A may further comprise network interface 220. Network interface 220 may be an interface for receiving data over a network, such as interaction data that is to be processed and analyzed. For example, the interaction data may be transaction data that is received over network interface 220.

A suitable processing computer architecture and associated methods may be found in U.S. patent application Ser. No. 15/639,094, filed on Jun. 30, 2017, which is herein incorporated by reference in its entirety for all purposes.

Processing computer 200A may further comprise computer readable medium 230 for storing instructions. In embodiments, computer readable medium 230 may be one or more memory storages comprising modules of code, such as communication module 230A, database access module 230B, and analytics engine 230C. Communication module 230A may comprise code for receiving, generating, sending, and reformatting data messages. Database access module 230B may comprise code for storing, updating, and querying data in one or more databases, such as aggregate data database 200B, and graph database 200C.

Analytics engine 230C may comprise code for analyzing interaction data to generate predictions. Analytics engine 230C may comprise graph generation module 231C for generating a topological graph from interaction data for a plurality of interactions. Analytics engine 230C may further comprise learning module 232C for executing a learning algorithm that can be used to generate and train a predictive model. In embodiments, the learning algorithm can be a graph learning algorithm for determining a plurality of communities from a topological graph of nodes and edges. Analytics engine 230C may additionally comprise prediction response module 233C for generating a prediction in response to a request made by a user. For example, prediction response module 233C may comprise code for applying data in a request to a predictive model comprising a plurality of communities. The data may include an account identifier of a user, a location of the user, a type of resource provider sought out by the user, and/or user inputted text. Upon application of the data to the plurality of communities, instructions of prediction response module 233C for determining a corresponding community, identifying a sufficient node in the community, and delivering information of the node to the requesting user may be executed by processor(s) 210.

In embodiments, processing computer 200A can access one or more databases, such as aggregate data database 200B and graph database 200C. Aggregate data database 200B may comprise interaction data and meta-information pertaining to interaction data. For example, the interaction data may comprise data relating to user transactions conducted at specific times, places, merchants, and for specific products, and the meta-information may comprise Internet meta-data that corresponds to the specific times, places, merchants, and specific products (e.g. media tags, product data, merchant reviews, social media data, etc.). According to embodiments, the interaction data and meta-information may be aggregated and used as training data for building a predictive model. For example, a predictive model for generating restaurant recommendations to consumers can be generated and trained using data stored in aggregate data database 200B by way of an unsupervised learning algorithm that groups consumers into distinct spending communities based on their transaction histories. In embodiments, the predictive model may comprise graph data, which may be stored in and retrieved from graph database 200C.

According to embodiments, processing computer 200A can be used to generate predictions requested by users. The predictions can be generated using a predictive model comprising a plurality of communities determined from interaction data.

In some embodiments, the computer readable medium 230 of the processing computer 200A comprise code for causing the processor 210 to perform a method comprising: a) receiving interaction data for a plurality of known interactions between resource providers and users; b) creating a topological graph based on the plurality of known interactions, the topological graph comprising nodes and edges; c) determining a plurality of communities to form a predictive model, each community comprising a dense collection of nodes connected by edges; d) receiving a request for a prediction; e) applying the request to the predictive model by identifying a community in the plurality of communities corresponding to the request; f) determining a node within the identified community; and g) providing information regarding the node as the requested prediction.

In some embodiments, the computer readable medium 230 of the processing computer 200A comprise code for determining a plurality of communities. Such code may be present in the learning module 232C. The code may be executable by the processor 210 to implement a method comprising: computing a weight of each edge in a topological graph, computing a weight of each node in the topological graph based on the computed weights of each of the edges, generating a queue comprising the nodes in decreasing order by weight, selecting a seed node from the queue, generating a community comprising the seed node, calculating an interaction probability for each candidate node not included in the community, determining a highest priority node based on the interaction probabilities, determining if the highest priority node meets predefined criteria, adding the highest priority node to the community if it is determined that the highest priority meets the predefined criteria, repetitively adding nodes until it is determined that the highest priority node does not meet the predefined criteria, outputting the community, removing the nodes included in the community from the queue, and repeating the entire process starting from seed selection until the queue has been emptied.

Figure 3:
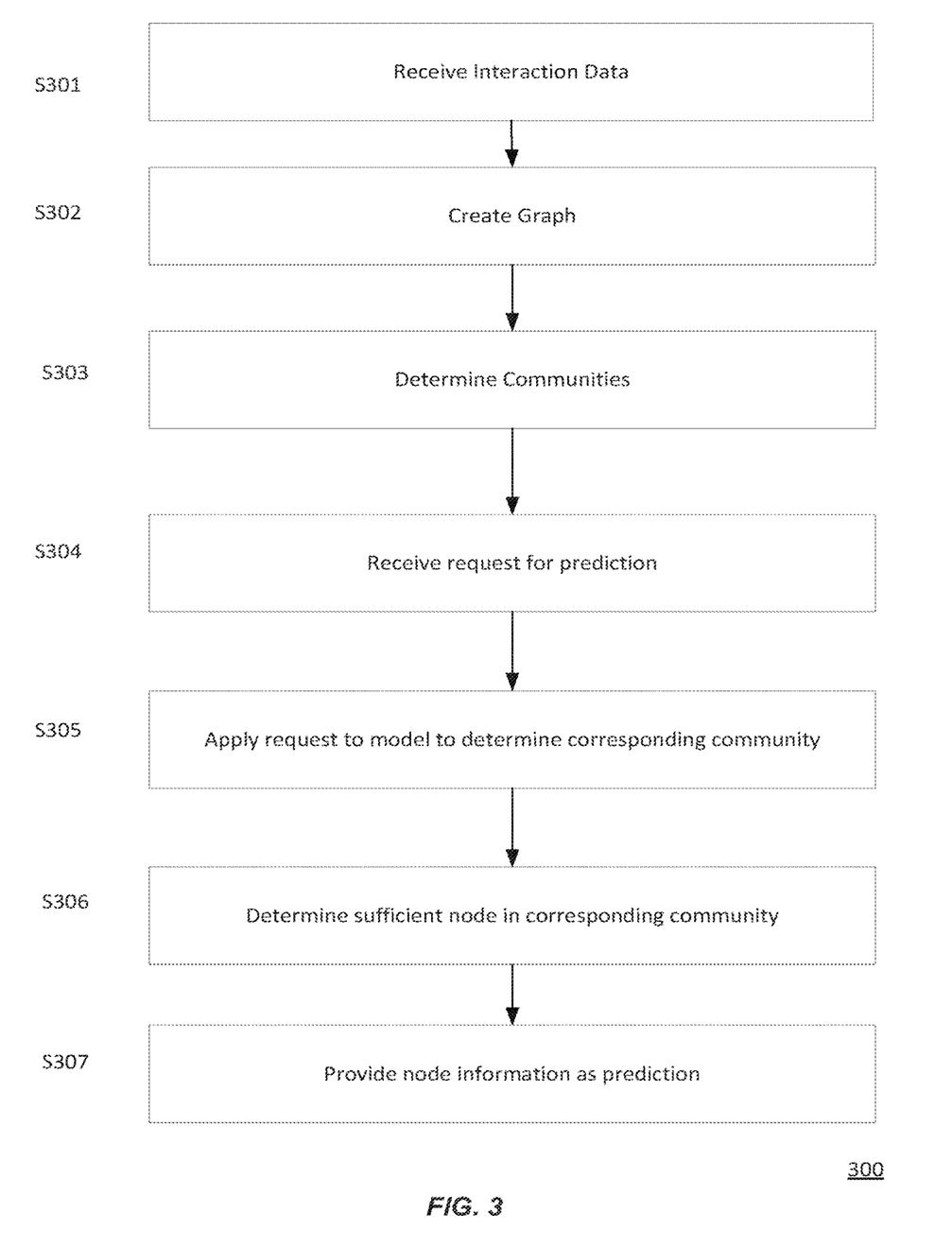
FIG. 3 shows a flowchart of a method for predicting future interactions from previous interaction data.

FIG. 3 shows a flowchart of a method performed by the processing computer 200A for predicting future interactions from previous interaction data. At step S301 of flowchart 300, interaction data for a plurality of known interactions may be received. The interaction data may be received by one or more processing computers, such as processing computer 200A of FIG. 2. The interaction data may be, for example, transaction data for a plurality of transactions conducted between users and resource providers. In embodiments, when a user interacts with a resource provider, interaction data comprising a plurality of information elements may be generated and/or received by a resource provider computer (e.g. by resource provider computer N—114 of FIG. 1) and may be processed and recorded by the one or more processing computers. Examples of information elements in interaction data may include: a transaction ID, an account ID for an account of an interacting user (e.g. account number, token, user name, etc.), an identifier for an interacting resource provider (e.g. merchant name, terminal number, etc.), a transaction amount, an interaction location, a transaction/interaction type (e.g., a mode of transaction such as magnetic stripe, e-commerce, contactless, contact, etc.), a resource provider type (e.g. a merchant category code or "MCC"), etc. The interaction data may be determined from a plurality of authorization request messages originating from a plurality of resource providers.

At step S302, a graph may be created from the interaction data. In embodiments, the graph may be a topological graph comprising nodes and edges (see FIG. 4). In an embodiment, a node for each distinct information element received amongst the plurality of received interaction data may be generated and plotted on the created graph. For example, a node for each user account identifier, resource provider identifier, MCC code, transaction location, transaction type, transaction amount, etc. may be generated and plotted. Then, the plotted nodes may be connected to one another via edges that represent the relationship/linkage between nodes. Each edge may be associated with a weight quantifying the interaction between the two nodes of the edge. For example, a node for an account identifier of a specific user may be connected to a node for a resource provider identifier of a specific resource provider. The weight of the connecting edge between the two nodes may reflect a quantity of interactions (transactions) between the specific resource provider and user. For example, the user may have conducted 5 transactions at the resource provider, which may result in the edge between the nodes having a weight of 5. Furthermore, the user account identifier node and resource provider identifier node may be related to other distinct information elements included in transaction data. For example, the node for the resource provider identifier may be connected to a node for a merchant category code relating to the resource provider (e.g. 5651—Family Clothing Stores). In another example, the node for the account identifier of the user identifier node may be connected to a node for a transaction location at which the transactions may have occurred (e.g. 94110—San Francisco). Thus, the nodes may represent data that are distinct from each other, and/or the nodes may characterize underlying data at specific levels of generality (e.g., a merchant ID may represent a specific merchant, but an MCC may represent a category of that the specific merchant is part of).

In one embodiment, a new node with little or no interaction data may be plotted on the graph by comparing meta-information of the new node to meta-information of plotted nodes to determine the new node's position in the graph. For example, social media data for a new resource provider (e.g. text from internet pages or social media posts mentioning a new restaurant) can be retrieved from aggregated data. The social media data can then be used to query the graph for a twin node relating to a similar resource provider that is associated with the same or similar social media data (e.g. a restaurant associated with the same text or keywords). A new node representing the new resource provider can then be generated and plotted on the graph, by replicating at least some of the interaction data for the similar resource provider and then plotting the new node according to the replicated interaction data (i.e. duplicating the twin node and its incident edges).

In embodiments, weights may also be related to 'distances,' as the position of two nodes relative to one another can be expressed as an Euclidean distance, in which edges between nodes have a specific length quantifying their relationship. For example, the relationship between two nodes can either be measured as a weight in which higher correlations are given by higher weights, or, the relationship can be measured as a distance, in which higher correlations are given by shorter distances. In the latter case, highly connected nodes that interact frequently with each other may be densely populated in the graph (i.e. close to one another within a distinct region of the graph). In one embodiment, the length of an edge can be inversely proportional to its weight.

In embodiments, a path may be defined as one or more edges that can be traversed to move from a first node to a second node. In one embodiment, the length of a path may be determined to be the total length of the edges included in the path. For example, a path may comprise edges [a,b], [b,c], and [c,d], which may each comprise edge lengths of 2, 3, and 4, respectively. The length of the path may then be found by summing the edges along the path and may be equal to, '2+3+4=9.' In another embodiment, the length of a path may be determined to be the number of edges along the path. For example, a path from node a to d may comprise three edges: [a,b], [b,c], and [c,d], and the length of the path may then be equal to '3.'

At step S303, communities may be determined from the created graph. The communities may be groups of nodes that are highly connected (as given by weights/distances) and may have a high probability of interacting with one another. These communities can then be used to classify incoming data and generate a predicted outcome (e.g. predicted interaction) for the incoming data. In an embodiment, the communities can be generated using an unsupervised learning algorithm that clusters nodes into distinct and densely populated groups. Furthermore, the learning algorithm can be an algorithm that generates communities that overlap (i.e. where nodes can belong to more than one community). For example, a graph learning algorithm for mapping groups of nodes in an interaction network can be used, as described in detail further below in the description. Once the communities have been determined, they may be accumulated and recorded in a graph database (e.g. graph database 200C of FIG. 2) to form a predictive model. For example, each community can be identified by a unique community ID, which may further be associated with unique identifiers for each node included in the community. The community information may be stored in a graph database, and at a later point in time, data received in a request for a prediction can then be compared to the determined communities to classify the data and generate the requested prediction.

At step S304, a request for a prediction may be received. In embodiments, the request may be received by one or more processing computers from a user device of a user requesting the prediction. The prediction can be, for example, a recommendation for a resource provider that is predicted to meet desired criteria of the requesting user. The request may include data that can be compared to a predictive model for generating the prediction. In an embodiment, the data included in the request may comprise an account identifier of the requesting user, a location of the user, a type of resource provider that is being requested by the user, and/or user inputted text. For example, the request may be generated by a user from a user device with which the user is able to select or manually enter a desired search query. The user may select, for example, a selection of "recommendation nearby," which may prompt the user device to generate a request for a prediction (recommendation). The request may comprise an account identifier for a payment account of the user and the current location of the user, which can be applied to a predictive model to recommend a resource provider within close proximity to the user, as further explained below. The user device may then send the request to a processing computer, which may receive the request and that can generate the requested prediction based on the received data.

At step S305, the request may be applied to the predictive model to identify a community corresponding to data in the request. In embodiments, the predictive model may comprise a plurality of communities comprising a plurality of nodes representing specific elements of information. A community comprising nodes for at least some of the data in the request can then be identified, so as to classify the request and generate the resulting prediction. For example, the request may comprise an account identifier for 'User X' and a location of 'Zip code: 94110,' and a node 401 (See FIG. 4) for 'User X' and a node 405 for 'Location: 94110—San Francisco' may be identified to be included in 'community A' 410. The processing computer may then identify 'community A' 410 as a community in which an interaction between 'User X' and a resource provider within 'community A' is likely to occur.

At step S306, a sufficient node in the identified community may be determined. For example, a node for resource provider that is highly connected within the identified community (e.g. within 'community A') may be determined. In one embodiment, this determination may be performed by traversing a path comprising nodes in the identified community until the sufficient node has been traversed. For example, referring to FIG. 4, a traversal may begin at an input node 401, for the account identifier of the requesting user, 'User X'. The traversal may continue by moving along an incident edge of the input node (i.e. along an edge connected the node) towards an adjacent node. For example, the incident edge that is traversed may be a highly weighted incident edge 407 connected to the input node of 'User X'. The traversed edge 407 may be connected to an adjacent node for a resource provider identifier, RP-1 403, of a merchant that 'User X' has previously conducted frequent transactions with. The traversal may then continue along adjacent edges until the sufficient node has been determined. For example, the traversal may continue from the adjacent node RP-1 403 to a node for a different account identifier 402 that is within the community. The different account identifier may be an account identifier for another user, 'User Y', that has also interacted with the resource provider identified by node 403 (i.e. also transacted at the merchant). The traversal may then continue from the node for the different account identifier to a node for a different resource provider identifier, RP-2 404. The different resource provider identifier may be for a resource provider that 'User Y' has frequently interacted with, but that 'User X' has not yet interacted with (e.g. a new restaurant that is popular within the users' community). The node for the different resource provider identifier can then be determined to be the sufficient node that satisfies the criteria of the requested prediction (i.e. is a resource provider that is highly connected to users within the community/has a high probability of interaction with users of the community). The sufficient node may then be the last node that is traversed and the traversal may terminate. An identifier for the sufficient node may then be outputted so that information relating to the sufficient node may be queried (e.g. from an aggregate data database) and provided in a prediction.

At step S307, information relating to the sufficient node may be provided as the requested prediction. For example, the sufficient node determined at step S306 may be a node for an identifier of a restaurant (e.g. restaurant name), and the prediction that is submitted to the user may then be the restaurant name, location (e.g. address), and any other relevant information (e.g. a website, reviews, hours of operation, items for sale, etc.). The information may then be sent to the user device of the user from which the prediction was requested. The information may then be received by the user device and displayed to the user. For example, the information may be displayed to the user as part of an aggregated list or as an image that the user can interact with.

Figure 5:
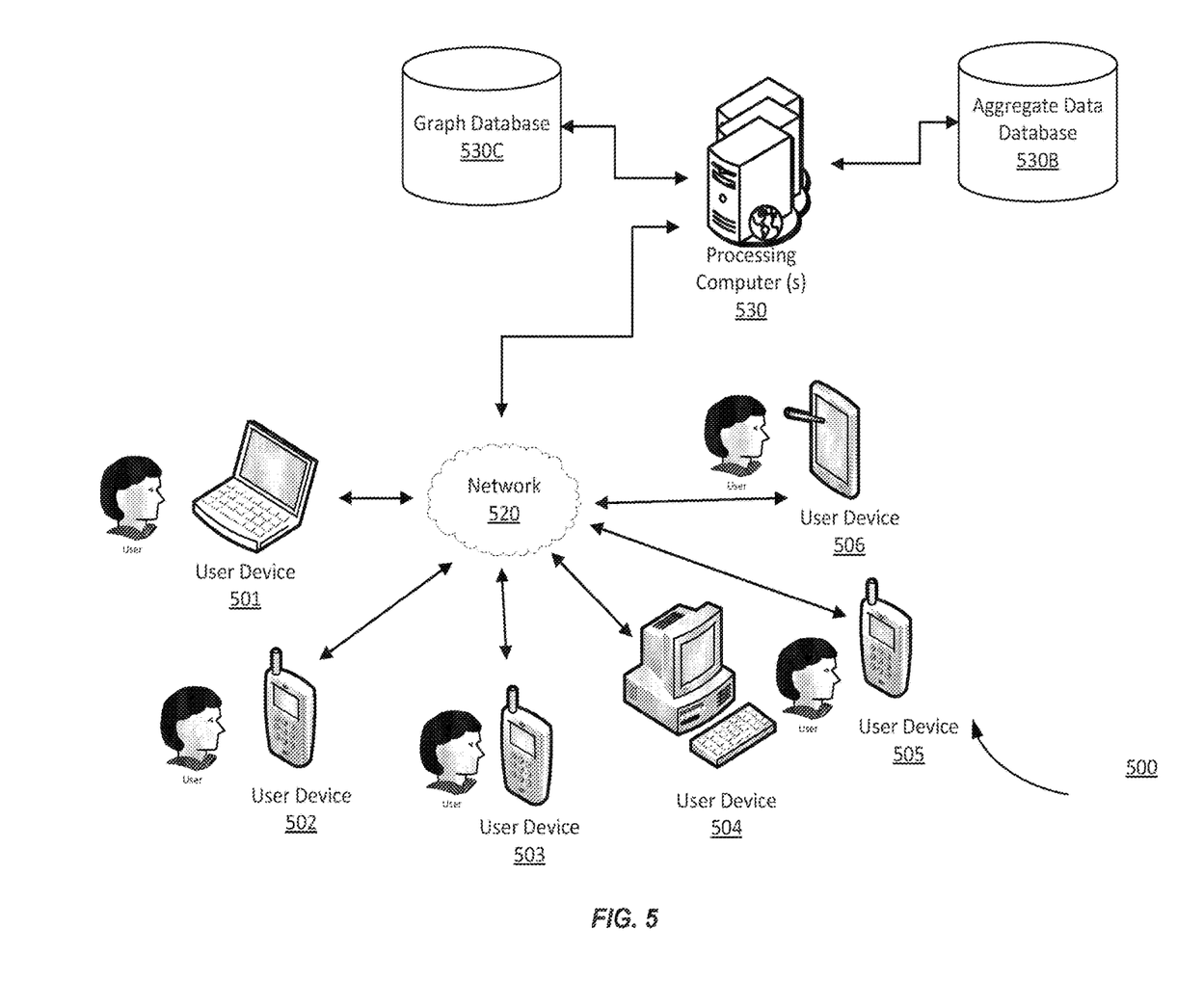
FIG. 5 shows a system diagram for delivering predictions to requesting users.

FIG. 5 shows a system diagram for delivering predictions to requesting users. System 500 may comprise a plurality of user devices (user device 501, 502, 503, 504, 505, etc.) operated by a plurality of users. The plurality of user devices may be connected to a network 520. Network 520 may be, for example, a wireless network operating according to any suitable protocol, such as TCP/IP, BSMAP, DTAP, SMSTP, FTP, VoIP, etc. Also connected to network 520 may be one or more processing computer(s) 530, which may have access to one or more databases, such as graph database 530C, and aggregate data database 530B. In one embodiment, processing computer(s) 530 may be processing computer 200A of FIG. 2.

According to embodiments, a user may use a user device to receive predictions over network 520. Each user may use his or her user device to generate a request for a prediction (e.g. a recommendation for a resource provider that they are likely to interact with). In embodiments, the user may use one or more input elements of the user device to generate the request, such as a keyboard, touchscreen, microphone, etc. The request may include data, such as an account identifier of the user, a location of the user or of the user device, a type of resource provider, and/or user inputted text. The request may be sent over network 520 and received by processing computer(s) 530. The processing computer(s) 530 may then generate a prediction by applying the data in the request to a predictive model. The predictive model may comprise a plurality of communities stored in graph database 530C, and generating the prediction may comprise identifying a community that corresponds to the request, identifying a sufficient node within the identified community (e.g. a resource provider node within the community), and then retrieving information of the sufficient node from aggregate data database 530B. The information of the sufficient node may then be sent over network 520 to the user device from which the request originated, as a response (i.e. prediction) to the received request.

As mentioned earlier in the description, in one embodiment, the plurality of communities that form the predictive model can be determined using a graph learning algorithm. The graph learning algorithm may be an unsupervised learning algorithm for generating overlapping communities for an interaction network. According to embodiments, an interaction network can be represented as an undirected simple graph G(V, E) with unique information elements of interaction data as nodes (i.e. vertices), V, and interactions between nodes as edges, E. Each edge may have a given length and/or weight, which may quantify the state of interaction between the connected nodes.

In one embodiment, nodes that frequently interact with one another, and/or have a high probability of interacting with one another, may be separated by short distances and may be densely populated within a given region of the graph, G. For example, a user may conduct a transaction at a first merchant once every 7 days (frequent interaction), and the length of the edge between a node of the user and a node of the first merchant can be 5. Meanwhile, the user may conduct a transaction at a second merchant once every 30 days (infrequent interaction), and the length of the edge between the node of the user and a node of the second merchant can be 10. As another example, a path from a user node to a node for a resource provider within the user's neighborhood or residential sector may be shorter and may require fewer edges to traverse than a path linking the user node to a resource provider located in an area that the user rarely visits.

In another embodiment, nodes that frequently interact and/or have a strong level of correlation to one another may be connected by highly weighted/strong edges. For example, a node for a resource provider that serves coffee and is busiest during morning hours may be a connected to a node for 10:00:00 by a strong edge of weight 20, but may be connected to a node for 18:00:00 by a weak edge of weight 1. As another example, a node for a resource provider that sells expensive consumer electronics may be connected to a node for a transaction amount of $100 by a strong edge with high weight, and may be connected to a node for a transaction amount of $1 by a weak edge of low weight.

According to embodiments, nodes of the graph, G, can be grouped into communities, K. Each distinct community, K, may comprise densely populated nodes that interact more frequently with one another than with nodes of a different community. Furthermore, a community may have a diameter, which may describe the scope of the community. In one embodiment, the diameter of a community may be denoted as, SP(K), and may be defined to be the largest length of any shortest path between any two nodes in K. For example, a community, K, may comprise nodes A, B, C, and D, and the shortest possible path between each pair of nodes may be 'AB: 1', 'AC: 3', 'AD: 4', 'BC: 2', 'BD: 3,' and 'CD: 1.' In this example, the diameter, SP(K) would be equal to 4, as the longest shortest path is 'AD:4.' In another embodiment, the diameter of a community, K, can be denoted by ASP(K), and may defined to be the average length of all the shortest paths between each pair of nodes in K. For example, a community comprising nodes 'A,' 'B,' 'C', and 'D' may have shortest paths 'AB: 1', 'AC: 3', 'AD: 4', 'BC: 2', 'BD: 3,' and 'CD: 1.' Then ASP(K) may be calculated as '(1+3+4+2+3+1)/6=2.333'.

Suitable methods for determining shortest paths in a graph may be found in U.S. patent application Ser. No. 15/590,988, filed on May 9, 2017, which is herein incorporated by reference in its entirety for all purposes.

Communities with the same diameter can have very different topologies. To distinguish different topologies of communities with the same diameter, another control parameter can be defined. For a more dense community, a node may be connected to most of the other nodes in the community. On the other hand, for a more sparse community, a node may be connected to only a few nodes within the community. To measure how strongly a node, v is connected in a community, K, the interaction probability $IN_{vK}$ of a node, v, to a community, K, where $v \notin K$, may defined by the equation:

$$IN_{vK} = \frac{m_{vK}}{n_K} \quad (1)$$

where $m_{vK}$ is the number of edges shared between the node v and the nodes included in K, and where $n_K$ is the number of nodes included in K.

Weighting Nodes

According to embodiments, to determine a plurality of communities from a graph, for each community, each edge in the graph may be assigned a weight. A methodology similar to the IPCA (identifying protein complexes algorithm) may be used to form communities. In one embodiment, for an input graph G=(V, E), the weight assigned to an edge between nodes u and v, [u, v], may be defined as the number of neighbors (adjacent nodes) shared by the nodes u and v. For example, node u may be connected to nodes a, b, c, x, y, and z. Meanwhile, node v may be connected to nodes x, y, and z. Therefore, the weight assigned to the edge [u,v] may be 3, as nodes u and v share three neighbors (nodes x, y, and z). In another embodiment, the weight of each edge may be computed based on a quantity of interactions comprising the two nodes connected by the edge. For example, the weight of an edge between nodes for a user and a resource provider may be 5, which may represent 5 transactions conducted by the user at the resource provider. As another example, the weight of an edge between a node for a resource provider and a node for MCC code that is present in every transaction conducted at the resource provider may have a weight of 100. Meanwhile an edge connecting the resource provider node to a node for an hour of operation at which 10% of the resource provider's transactions occur may have a weight of 10.

In embodiments, a weight for each node in the graph may also be computed. In one embodiment, the weight of each node may be computed as the sum of the weights of its incident edges. For example, a node may be connected to 5 adjacent nodes and the weights of the incident edges connecting the node to the 5 adjacent nodes may be '3,3,4,6,9.' The weight of the node may be then be computed as, '3+3+4+6+9=25.' In embodiments, after all nodes have been assigned weights, the nodes may be sorted in decreasing order by weight, and stored in a queue, $S_q$.

Selecting Seed

In one embodiment, each community that is to be built may originate from a seed node. The seed node may serve as a first node in a community that is being generated, and the community may be further built by extending the community from the first node based on whether or not nearby nodes meet predefined criteria. The predefined criteria for adding nearby nodes is further described below. In one embodiment, the highest weighted nodes in the queue Sq may be selected as the seed nodes of each community. In an embodiment, to begin the process of determining communities from the graph, the first node (i.e. highest weight node) in the queue Sq may be selected a seed node to grow a new community.

Extending Community

According to embodiments, a new community may be built from a seed node by extending the community K to include nearby nodes (neighbors) that are connected to one or more nodes included in the community. In one embodiment, the new community K may be extended by adding nodes recursively from its neighbors according to priority. In one embodiment, the priority of a neighbor v of K may be determined by the value $IN_{vK}$, the interaction probability between v and the nodes of the new community K. In an embodiments, the node with the highest interaction probability against K may be selected as the neighboring node with the highest priority.

In embodiments, whether a high priority neighboring node v is added to the new community is determined by an Extend-judgment test that tests if v is a (K, $T_{in}$, d)-vertex. The predefined criteria for a (K, $T_{in}$, d)-vertex evaluated in the Extend-judgement test is described below. In an embodiment, a candidate node v may be added to the new community if the candidate node v is a (K, $T_{in}$, d)-vertex. Once the new node v is added to the community, the community may be updated, i.e., the neighbors of the new community may be re-constructed from the graph, G, and the priorities of the neighbors of the new community may be re-calculated.

Extend-Judgment

In an embodiment, whether or not a candidate node (neighboring node) v is added to a community K may be determined by two conditions. First, interaction probability $IN_{vK}$, of the candidate node against the community may be calculated. In an embodiment, the candidate node will not be added to the community if the value $IN_{vK}$ is less than a predetermined threshold, $T_{in}$. In one embodiment, the predetermined threshold, $T_{in}$, may be a predetermined number between 0 and 1. In embodiments, the predetermined threshold, $T_{in}$, may be chosen to control the number of nodes included in each community as well as the total number of communities generated. For example, a greater $T_{in}$ value may result in a greater number of communities as well as fewer nodes in each community. Meanwhile a lower $T_{in}$ value may result in fewer communities, with each community comprising a greater number of nodes. This may further affect the outputted predictions of the model, as a model with more communities may have greater resolution and may result in more precise predictions (e.g. fewer false positives); however, a model comprising communities that include a large number of nodes may be capable of predicting interactions that would have otherwise been missed had the communities been any smaller (e.g. interactions with lower probability that can nevertheless occur). Accordingly, a $T_{in}$ value may be selected based on the balance between these outcomes, and may be adjusted for desired results.

According to embodiments, if the candidate node v passes this first test, the diameter of the extended community K+v, may be calculated. As described above, the diameter of a community can be calculated as the largest length (i.e. maximum possible length) of any shortest path between any two nodes in the community, SP(K), or can be calculated as the average length of all shortest possible paths between each pair of nodes in the community, ASP(K). In an embodiment, the diameter of the graph K+v may be calculated and compared to a parameter d, which may be a pre-established boundary for communities that are being built. If the computed value of the diameter of K+v is bounded by d, then the vertex v may be added to the community (i.e. K=K+v). The parameter d may be set based on the nature of the interaction data that is being used. For example, it may be determined that for an interaction network of users and resource providers, 95% of interactions occur between users and resource providers that are only 5 or fewer connections away from each other, and the parameter d may be set as '5. If the node v fails to meet either of the predefined criteria, then the next highest priority neighbor of the community is tested, and so on. Once all remaining neighbors of the community fail to meet the predefined criteria, then the community cannot be further extended, and the nodes of community K may be completely determined. Then, the nodes included in community K, as completely built, may be removed the queue $S_q$ before selecting the next node in the queue.

Once the building of a community has been completed, all of the nodes included in the community may be removed from the queue $S_q$, and the first node (highest weighted node) remaining in the queue $S_q$ may be selected as the seed for the next community, which may then be extended according to the above process. The selecting seed, extending community, and extend-judgement processes may be repeated until the queue $S_q$ has been completely emptied.

Accordingly, this approach may generate overlapping communities, as the nodes of the generated communities are only removed from the queue Sq, but not from the original graph G from which candidate nodes are selected from during the extending community process. Furthermore, the process may guarantee that no two generated communities would be same, as the seed node for a new community may be selected such that the seed node does not belong to any of the previously constructed communities. The technical advantages of the above mentioned features include the expression of multiple traits of any given node when making a prediction. This allows for more accurate predictions that can be tailored to specific locations, time of days, etc., and thus can account for a large range of qualities of any given node. For example, prior methods for predicting interactions could only classify nodes into a single community, whereas the currently presented method accounts for nodes belonging to multiple communities. This may be beneficial, for example, when predicting interactions between users and resource providers that belong to more than one community, and whose interactions vary as conditions change. Furthermore, the method allows for the mapping of interactions at multiple levels. This is of particular use for predicting interactions between users and resource providers, as correlations between users and resource providers are expressed in each community (i.e. by account number and name) as well as non-intuitive correlations between concepts relating to the users and resource providers, such as location and MCC code. Even further, correlations between concepts relating to interactions themselves may be expressed, such as the time and nature of the interaction that occurred (e.g. as expressed by transaction amount and by the means by which a transaction was conducted).

Figure 4:
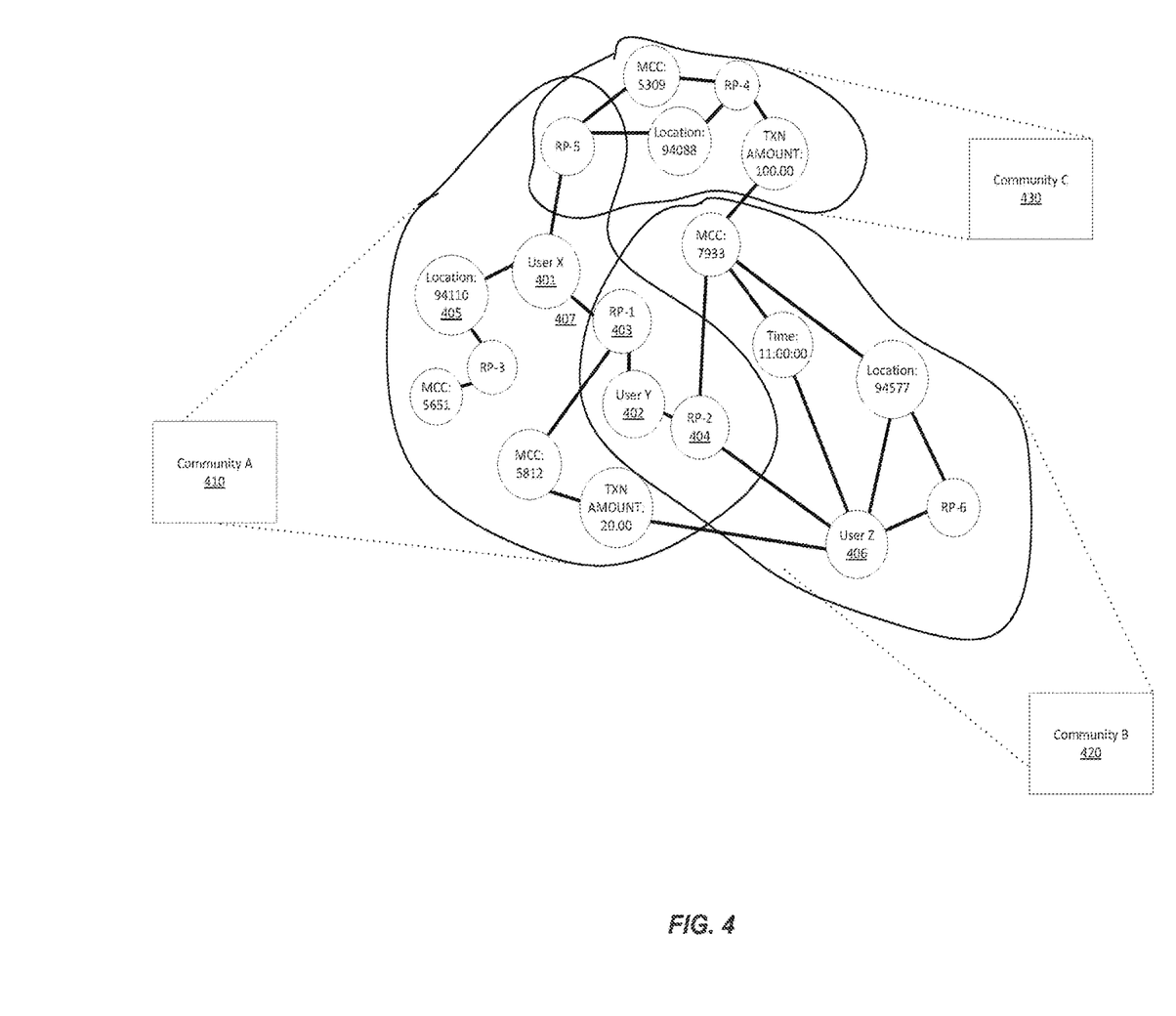
FIG. 4 shows an illustration of a topological graph according to an embodiment.

With reference to FIG. 4, the benefits of the described method can be readily seen. For example, User X 401 and User Y 402 may be two different consumers belonging to two different spending communities. User X 401 may belong to community A 410, which may comprise nodes relating to young consumers ages 22-35, merchants that appeal to young consumers ages 22-35, and relating to the types of transactions that young consumers ages 22-35 conduct. For example, Community A 410 may comprise nodes for the payment account numbers of the younger consumers and nodes for merchants such as bars, clothing stores, and restaurants that are popular with younger consumers and where the payment account numbers have been frequently used. Community A 410 may also include nodes for merchant category codes that describe the merchant's primary business (e.g. restaurant, bar, etc.), nodes for locations in which those types of merchants can typically be found (e.g. urban areas, streets associated with nightlife, etc.), and for transaction amounts typically conducted for each transaction (e.g. $20 on average). Conversely, User Y 402 may belong to community B 420, which may comprise nodes relating to family oriented merchants and consumers between the ages of and 40-70 that typically conduct transactions at said merchants. For example, community B 420 may include nodes for family brunch restaurants, MCC codes for family entertainment type establishments (e.g. bowling alleys, theme parks, movie theaters, etc.), locations where said establishments may exist (e.g. near suburban areas where middle-income families live), and nodes for times at which transactions at these establishments may typically occur (e.g. around 11 am on a Saturday or Sunday). RP-1 403 shown in FIG. 4 where community A 410 and community B 420 overlap, may be a node for a merchant that may appeal to both young consumers (e.g. User X 401) and family-oriented consumers (e.g. User Y 402) depending on certain conditions. For example RP-1 403 may be a restaurant that serves family brunch during the day and that also operates as a popular bar at night. The method described herein may allow for both expressions of the RP-1 403 to be accounted for in a predictive model, and may do the same for other merchants that also have multiple expressions, purposes, customer bases, etc. This may result in more accurate recommendations that greatly benefit both consumers and merchants. For example, User Y may request from his device, a recommendation for a place that serves brunch that his family can take his family after church, and a processing computer may return information for RP-1 403, which may be a non-intuitive result, as RP-1 403 is a popular bar downtown that is typically associated with nightlife. Hence, the method described may use interaction data to determine multiple expressions of each resource provider, which may accelerate the process of connecting resource providers to users that may readily interact with them.

It should be understood that the present invention as described above can be implemented in the form of control logic using computer software (stored in a tangible physical medium) in a modular or integrated manner. Based on the disclosure and teachings provided herein, a person of ordinary skill in the art will know and appreciate other ways and/or methods to implement the present invention using hardware and a combination of hardware and software.

Any of the software components or functions described herein, may be implemented as software code to be executed by a processor using any suitable computer language such as, for example, Java, C++ or Perl using, e.g., conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses in a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
    a) receiving, by one or more computers, interaction data for a plurality of known interactions between resource providers and users, the resource providers being merchants and the users purchasing goods and services at the merchants;
    b) creating and training, by the one or more computers, a predictive machine learning model comprising a topological graph comprising nodes and edges, and based on the plurality of known interactions using an unsupervised machine learning algorithm and the interaction data, and by changing weights associated with the nodes and edges;
    c) determining, by the one or more computers, a plurality of communities using the trained predictive machine learning model and assigning each community with a community identifier, wherein each community is determined by identifying densely connected nodes starting from a seed node and adding nodes with high interaction probability until a threshold is met, wherein the densely connected nodes are nodes that interact with a greater frequency than other connected nodes, and wherein the communities in the plurality of communities contain common nodes;
    d) receiving, by the one or more computers, a request for a prediction;
    e) applying the request to the predictive machine learning model, by the one or more computers, by identifying a second community in the plurality of communities by a community identifier based on an account identifier in the request for the prediction, the account identifier being in a first community, wherein nodes in the first community and the second community overlap;
    f) determining, by the one or more computers, a node within the identified community by traversing a path starting from the account identifier to the node via one or more other nodes, the path including a node that is common to both the first community and the second community; and g) providing, by the one or more computers, information regarding the node as the requested prediction.

2. The method of claim 1, wherein the interaction data comprises interaction elements including transaction IDs and account IDs.

3. The method of claim 2, wherein the interaction data further comprises transaction amounts.

4. The method of claim 2, wherein the interaction data further comprise interaction locations and resource provider identifiers.

5. The method of claim 4, wherein in step a), the interaction data is received from a processing computer.

6. The method of claim 1, wherein the request for the prediction also includes data comprising one or more of: a location of a user associated with the account identifier, a type of resource provider, and user inputted text.

7. The method of claim 6, wherein determining the node within the identified community in step f) comprises:
  terminating the traversal upon traversal of a last traversed node associated with the data included in the request for the prediction; and
  outputting an identifier for the last traversed node associated with the data, the identifier for the last traversed node being the information regarding the node.

8. The method of claim 1, further comprising:
  receiving meta-information for a first resource provider;
  querying the topological graph for a twin node for a second resource provider associated with the meta-information; and
  generating a new node relating to interaction data for the twin node.

9. A computer comprising:
  a processor;
  a network interface; and
  a computer readable medium, the computer readable medium comprising code, executable by the processor, instructing the computer to:
    a) receive interaction data for a plurality of known interactions between resource providers and users, the resource providers being merchants and the users purchasing goods and services at the merchants;
    b) create and train a predictive machine learning model comprising a topological graph comprising nodes and edges, and based on the plurality of known interactions using an unsupervised machine learning algorithm and the interaction data, and by changing weights associated with the nodes and edges;
    c) determine a plurality of communities using the trained predictive machine learning model formed using the unsupervised graph learning algorithm and assigning each community associated with a community identifier, wherein each community is determined by identifying densely connected nodes starting from a seed node and adding nodes with high interaction probability until a threshold is met, wherein the densely connected nodes are nodes that interact with a greater frequency than other connected nodes, and wherein the communities in the plurality of communities contain common nodes;
    d) receive a request for a prediction;
    e) apply the request to the predictive machine learning model by identifying a second community in the plurality of communities by a community identifier based on an account identifier in the request for the prediction, the account identifier being in a first community, wherein nodes in the first community and the second community overlap;
    f) determine a node within the identified community by traversing a path starting from the account identifier to the node via one or more other nodes, the path including a node that is common to both the first community and the second community; and
    g) provide information regarding the node as the requested prediction.

10. The computer of claim 9, wherein the request for the prediction from a user device operated by a user associated with the account identifier.

11. The computer of claim 10, wherein the interaction data is determined from a plurality of authorization request messages.

12. The computer of claim 10, wherein the interaction data is determined from a plurality of authorization request messages from a plurality of resource providers.

13. The computer of claim 12, wherein the interaction data comprises resource provider types.

14. The computer of claim 9, wherein the request for the prediction includes data comprising one or more of: a location of a user associated with the account identifier, a type of resource provider, and user inputted text.

15. The computer of claim 14, wherein determining the node within the identified community in step f) comprises:
  terminating the traversal upon traversal of a last traversed node associated with the data included in the request for the prediction; and
  outputting an identifier for the last traversed node associated with the data, the identifier for the last traversed node being the information regarding the node.

16. The computer of claim 9, wherein the code, executable by the processor, further comprises instructions to:
  receive meta-information for a first resource provider;
  query the topological graph for a twin node for a second resource provider associated with the meta-information; and
  generate a new node relating to interaction data for the twin node.

17. A user device comprising:
  a processor;
  a network interface;
  one or more input elements;
  a display; and
  a computer readable medium, the computer readable medium comprising code, executable by the processor, instructing the user device to:
    receive, from a user of the user device, one or more inputs relating to a request for a prediction, the one or more inputs being received and processed by the user device via the one or more input elements;
    generate the request for the prediction based on the one or more inputs from the user;
    send, via the network interface, the request for the prediction to one or more computers;
    receive, via the network interface, data for the requested prediction, the data for the prediction being generated by the one or more computers by applying the request to a trained predictive machine learning model generated from interaction data of the user and other users of other user devices, the interaction data is obtained from authorization request messages from a plurality of resource providers, the trained predictive machine learning model formed by creating and training, by the one or more computers, a predictive machine learning model comprising a topological graph comprising nodes and edges, using the interaction data and an unsupervised graph learning algorithm, and by changing weights associated with the nodes and edges, and the users and determining, by the one or more computers, a plurality of communities to form the predictive machine learning model and assigning each community associated with a community identifier, wherein each community is determined by identifying densely connected nodes starting from a seed node and adding nodes with high interaction probability until a threshold is met, wherein the densely connected nodes are nodes that interact with a greater frequency than other connected nodes, and wherein the communities in the plurality of communities contain common nodes; and display the data for the requested prediction to the user using the display.

18. The user device of claim 17, wherein the interaction data comprises transaction amounts.

19. The user device of claim 17, wherein the request for the prediction includes data comprising one or more of: a location of a user associated with an account identifier, a type of resource provider, and user inputted text.

20. The user device of claim 18, wherein the data for the prediction displayed to the user comprises information for one or more nodes in a community of the plurality of communities that is related to the request, and wherein the information for the one or more nodes is displayed to the user as an aggregated list or as an image.

* * * * *